United States Patent [19]
Hatch et al.

[11] Patent Number: 5,897,770
[45] Date of Patent: Apr. 27, 1999

[54] CENTER CORE CARTRIDGE FEEDER INSERT

[75] Inventors: Gary L. Hatch; Bruce A. Stump, both of Sheboygan, Wis.

[73] Assignee: Plymouth Products, Inc., Sheboygan, Wis.

[21] Appl. No.: 08/956,905

[22] Filed: Oct. 23, 1997

[51] Int. Cl.⁶ .................................................. C02F 1/76
[52] U.S. Cl. .......................... 210/101; 210/130; 210/135; 210/206; 210/209; 210/282; 422/264; 422/278; 422/282
[58] Field of Search .................................. 210/697, 755, 210/101, 192, 198.1, 205, 206, 209, 282, 130, 135; 422/264, 278, 282

[56] References Cited

U.S. PATENT DOCUMENTS

| | | | |
|---|---|---|---|
| 3,357,563 | 12/1967 | Sicard | 210/209 |
| 4,014,794 | 3/1977 | Lewis | 210/199 |
| 4,265,748 | 5/1981 | Villani et al. | 210/132 |
| 4,780,197 | 10/1988 | Schuman | 210/136 |
| 5,024,268 | 6/1991 | Cheadle et al. | 210/209 |
| 5,527,452 | 6/1996 | Grigoriev et al. | 210/130 |
| 5,662,799 | 9/1997 | Hudgens et al. | 210/192 |
| 5,772,873 | 6/1998 | Hudgens et al. | 210/192 |

*Primary Examiner*—Peter A. Hruskoci
*Attorney, Agent, or Firm*—Andrus, Sceales, Starke & Sawall

[57] ABSTRACT

A feeder insert apparatus for a tubular water filtration cartridge utilized in household point of use water filtration systems. The feeder insert allows a chemical to be fed into a incoming water supply at a controlled rate by employing a bypass system that allows a predetermined amount of incoming water to flow past the feed chemical without contacting the chemical. The amount of water in the bypass flow can also be manually adjusted through the use of two adjustment mechanisms, an adjustable ring and a rotatable end cap, located on the feeder insert.

12 Claims, 3 Drawing Sheets

CENTER CORE CARTRIDGE FEEDER INSERT

BACKGROUND OF THE INVENTION

The present invention relates to point of use water filtration systems employed in purifying household drinking and tap water. In particular, the present invention relates to a feeder insert for a water filtration cartridge. The insert contains additional purification substances from those contained in the filtration cartridge for release into the household water supply by the insert to further purify the water flowing through the filtration cartridge. The feeder insert can also contain chemicals to be released into the water supply that perform functions other than water purification, such as phosphate descaling agents.

Prior art point of use water filtration systems remove water-borne contaminants in generally the same way. They employ a housing comprised of a sump, a hollow, tubular filtration cartridge contained within the sump and an inlet/outlet cap detachably mounted to the sump. The incoming water to be filtered flows into the system housing through the inlet of the cap and down into the sump containing the filter cartridge. The water then flows radially through the filtration cartridge, contacting the purification substance held within the filtration cartridge to remove the contaminants present in the water. Upon exiting the interior surface of the filtration cartridge, the water enters a central, axial chamber defined by the filtration cartridge. The water flows upward along this chamber through the upper end of the filtration cartridge to an outlet from the system located at the outlet end of the cap.

While most point of use water filtration systems employ this general mechanism, the exact process and purification substance by which the contaminants are removed in the filtration cartridge differ from system to system. Some systems employ a simple pleated paper filter located within the filtration cartridge to remove the water-borne contaminants present in the water. Others employ a semi-permeable membrane located in the filter cartridge for use in a reverse osmosis process to remove the contaminants. Other systems employ activated carbon either in block or granular form within the filtration cartridge as the main ingredient for removing the contaminants.

Regardless of the material used for removing the water-borne contaminants in the filtration cartridge, a problem still exists when a large amount of potentially harmful organisms including bacteria, viruses and other microbes are present within the household water supply. Most of these filtration substances are able to remove the majority of bacteria and microbes present in the water supply, but they are unable to remove them completely and are also unable to remove any of certain types of these organisms, namely viruses, that may be present. In order to reduce the severity of this problem with microbial contaminants, one can incorporate an additional filter containing another purification substance in addition to the substance already present within the filtration system filter cartridge. It is well known in the prior art to place these additional filters within the central, axial chamber defined by the filtration cartridge. Some of the additional filters are formed of the same purification substance contained within the filtration cartridge in order to provide a second, identical filtration mechanism to remove the which remain in the water supply after the first filtration mechanism. While further reducing the amount of certain organic contaminants, such as the bacteria and microbes present with the water supply, if these filters employ the same materials as the filtration cartridge, they serve to lessen the amounts present, but not to remove them entirely.

Other filtration systems employ a purification substance different from that contained in the filtration cartridge to perform a second filtration function on the water flowing through the filtration cartridge. The filtration system of U.S. Pat. No. 5,252,206 employs a ceramic inner filter disposed within a filtration cartridge containing a carbon block outer filter. The ceramic inner filter, with its small pore size, serves to capture and retain bacteria and other particulate contaminants that remain in the water supply after the water is filtered through the carbon block outer filter. The ceramic filter extends the entire length of the central, axial chamber defined by the filtration cartridge. However, while this type of combination filter does effect the increased removal of microbial contaminants from the water supply, it does so with certain limitations. The ceramic filter tends to collect the dead microbes on its outside surface and hence must be periodically removed and cleaned in order for the filter to maintain its microbial filtration activity.

In order to prevent this bacterial buildup on the outside surface of the ceramic filter, U.S. Pat. No. 5,164,085 discloses a inner ceramic filter impregnated with silver, a well known bacteriocidal agent. However, even with this improved microorganism removal due to the presence of silver within the ceramic filter, the complete removal of bacteria, viruses and other microorganisms still cannot be achieved. Very small viruses are able to pass unhindered through the pores of the ceramic filter and remain in the water supply. Also the amount of silver that is impregnated in the ceramic filter is usually less than that required for complete removal of any microbes present in the water supply. This is due to the fact that the amount required for a complete microbial kill is above the maximum safe level for silver allowed to be present in a household water supply.

In response to this limitation, U.S. Pat. No. 5,273,650 discloses a multi-media filter able to overcome the limitations present in the prior art concerning the maximum amount of silver or silver compounds able to be impregnated within a ceramic filter used in a point of use water filtration system. The filter employs a ceramic pre-filter located in the position where prior art filtration systems utilizes the carbon block filtration cartridge. This ceramic pre-filter contains within its central core a halogenated purification resin. Incoming, unpurified water flows through the ceramic pre-filter removing some of the microbes present with the water supply, and then contacts the halogenated resin. This resin effects an instantaneous microbiocidal kill on the remaining microbes present in the water supply. Furthermore, if any microbes should happen to survive passage through the halogenated resin, the resin leaves residual iodine, or any other halogen used, in the water supply allowing for a continued microbiocidal effect downstream from the halogenated resin and through the outlet portion of the filtration system. The amount of resin present with the central core of the ceramic pre-filter can also be adjusted through using a filler rod disposed in the bottom of the central core. The filler rod can be made any length, reducing the space available for the resin in the central core and, thus, allowing for adjustment of the amount of resin available to respond to differing amounts of microbes present in a particular water supply. While this system overcomes the limitations on microbiocidal effects due to reduced amounts of silver allowable in ceramic filters found in the prior art, the ceramic pre-filter still needs to be removed to clean off the bacteria and microbes which collect on its exterior surface to allow for the pre-filter to function normally.

U.S. Pat. No. 5,061,367 discloses a cylindrical water filtration cartridge for use in a household point of use water filtration system which contains a halogenated resin outer filter and an activated carbon inner filter disposed with a central core formed by the outer halogenated resin filter. Water flowing into the cartridge first contacts the halogenated resin, effecting a complete microbial kill of any bacteria or microbes present within the household water supply. The water then flows into the activated carbon filter for removal of any metals or other particulate matter suspended within the water supply. The cartridge also allows for varying amounts of halogenated resin to be contained within the cartridge. One way in which this adjustment is accomplished is through the use of a buffering resin present within the cartridge below the halogenated resin to both reduce the amount of halogenated resin available by taking up space within the cartridge and also to prevent highly alkaline water supplies from unnecessarily increasing the release of the microbiocidal halogens from the halogenated resin. Another method employed to effect the adjustment of the amount of halogenated resin present in the cartridge utilizes, a scavenger resin. Located above a halogenated resin within the cartridge, this scavenger resin serves to reclaim any excess halogen released into the water supply by the halogenated resin, thus reducing any harmful or unpleasant effects to the ultimate consumers that may be caused by excess halogens present in a water supply system. By employing the halogenated resin as a microbiocidal agent, this invention eliminates the need for a ceramic filter and thus eliminates the problems of the prior art ceramic filters with respect to silver content and microbe collections on the exterior surface of the ceramic filters. However, this invention does have a significant limitation in that the adjustment of the amount of halogenated resin present in the cartridge available to effect a microbiocidal kill on any microbiological material present within the water supply is not easily accomplished. In order to adjust the level of halogenated resin present, the entire cartridge must be removed and replaced with a separate cartridge containing a different amount of halogenated resin.

BRIEF SUMMARY OF THE INVENTION

The present invention is a feeder insert designed for releasing chemicals into a household water supply from a point of use water filtration system. The insert has a mounting means capable of holding the insert in engagement with a tubular filtration cartridge while the insert is disposed within the center chamber defined by the tubular filtration cartridge. After flowing radially through the tubular filtration cartridge, incoming water flows into an inlet end of the insert passing through a set of flow holes located on the inlet end, through an upstream containment chamber, out an outlet end of the upstream containment chamber containing a second set of flow holes and into a downstream flow bypass chamber from which it is discharged to the outlet for the water filtration system. The upstream containment chamber holds a chemical to be fed or released into the inlet water stream flowing through the containment chamber. Any suitable chemical may be held within the containment chamber for release into the inlet water stream, such as a halogenated resin for additional water purification or a soluble phosphate for added descaling protection. All the inlet water flowing through the filtration cartridge does not contact the chemical, however. Metering notches are present in the exterior of the downstream flow bypass chamber that allow a certain amount of inlet water to flow directly into the bypass chamber without entering the upstream containment chamber. This water passes through to the outlet of the system without contacting the chemicals contained in the insert. In this manner the chemicals can be applied to the inlet water in a pre-selected amount.

The amount of water entering the inlet of the containment chamber and contacting the chemical within can be further regulated using one or both of two possible adjustment mechanisms that may be located on the feeder insert. The first mechanism is a rotatable end cap located on one of the ends of the containment chamber. The rotatable end cap adjusts the inlet water flow into the containment chamber by selectively positioning a water entrance slot over the flow holes located on the ends of the stationary containment chamber, thereby increasing or decreasing the amount of water flowing into the chamber. The inlet water flow can also be adjusted through the use of a adjustable ring located around the exterior of the downstream flow bypass chamber. The adjustable ring contains a bypass slot which may selectively open and close metering notches also located in the exterior of the downstream flow bypass cavity. The more metering notches which are exposed to the incoming water flow, the greater the amount of water is allowed to flow through these notches directly into the downstream flow bypass chamber and circumventing the upstream containment chamber.

It is an object of the present invention to supply a feeder insert for a water filtration system that is capable of releasing a desired amount of a chemical into the incoming supply.

It is a further object of the invention to provide a feeder insert that can be easily adjusted to control the amount of chemicals released into the incoming water supply using the adjustment mechanisms located on the feeder insert.

It is a further object of the invention to provide an adjustable feeder insert that is easily replaceable at low cost.

BRIEF DESCRIPTION OF THE SEVERAL VIEWS OF THE DRAWING

The drawings furnished herewith illustrate a preferred construction of the present invention in which the above advantages and features are clearly disclosed as well as others which will be readily understood from the following description of the illustrated embodiment.

DETAILED DESCRIPTION OF THE INVENTION

Figure 1:
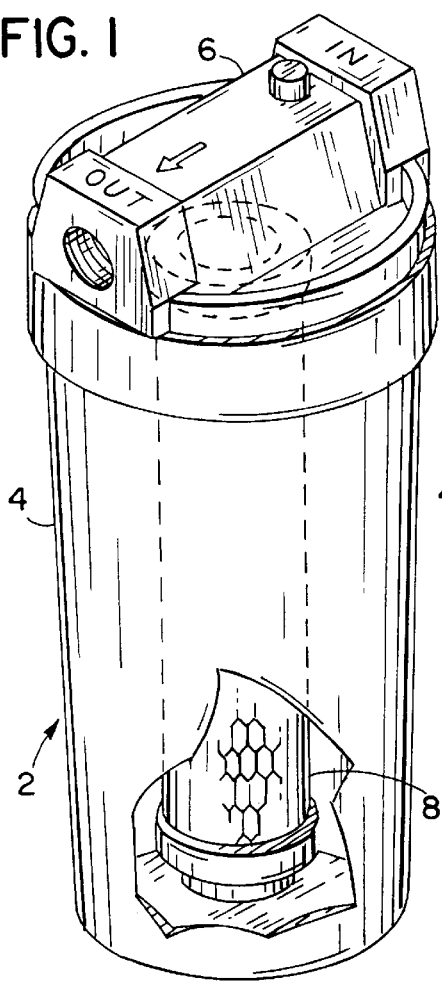
FIG. 1 is a partially broken away perspective view of a water filtration system housing in which the present invention is used.

The present invention is for use in a standard point of use water filtration system housing 2, an example of which is shown in FIG. 1. This housing 2 is comprised of a sump portion 4, an inlet/outlet cap 6 threadably mounted to the sump portion 4 and a tubular filtration cartridge 8 located within the sump portion 4. The tubular filtration cartridge 8 is removable from the sump portion 4 so that it may be replaced when the filtration substance 10 contained within the tubular filtration cartridge 8 becomes saturated with particulate contaminants removed from in the incoming water supply.

Figure 2:
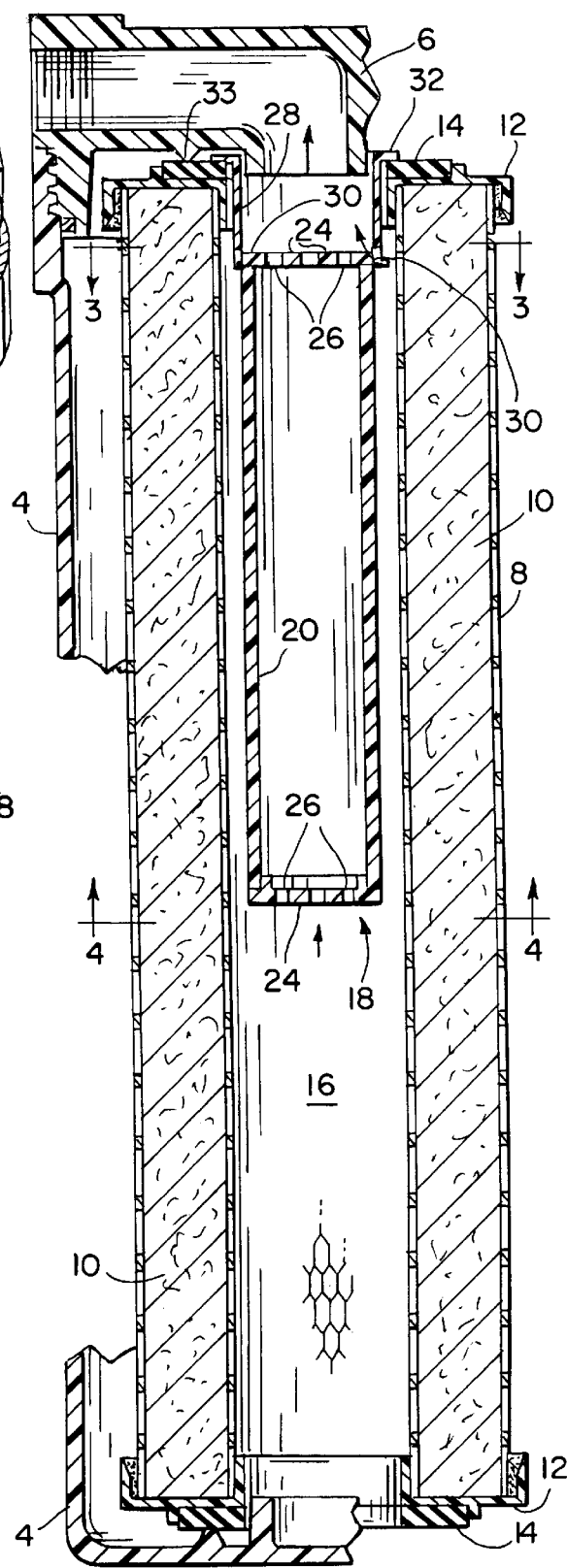
FIG. 2 is a cross-sectional view of a tubular filtration cartridge and a feeder insert made pursuant to the present invention disposed within the housing.
Figure 3:
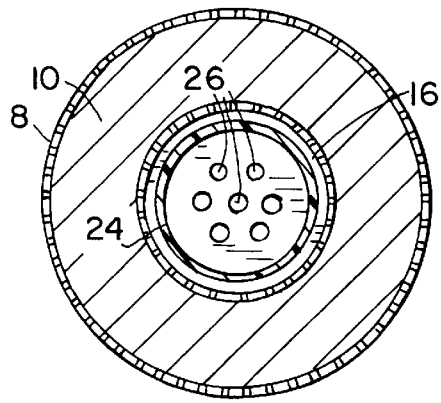
FIG. 3 is a cross-sectional view taken along line 3—3 of FIG. 2.
Figure 4:
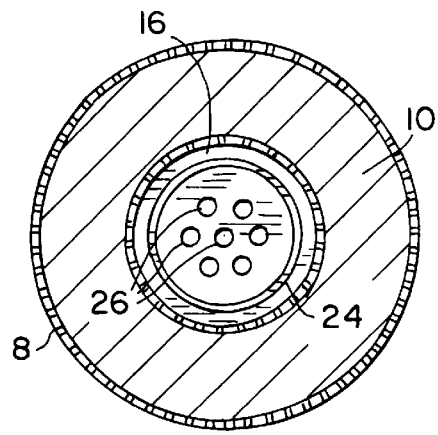
FIG. 4 is a cross-sectional view taken along 4—4 of FIG. 2.

As shown in FIG. 2 enclosing the filtration substance 10 within the tubular filtration cartridge 8 are cartridge end caps 12 located at either end of the filtration cartridge 8. Located on the cartridge end caps 12 opposite the tubular filtration cartridge 8 are rubber seals 14 that create water tight seals between the tubular filtration cartridge 8 and both the sump portion 4 and the inlet/outlet cap 6. Both the cartridge end caps 12 and rubber seals 14 are shaped as annular rings to accommodate the flow of incoming water through the central, axial chamber 16 located within the center of the tubular filtration cartridge 8. As shown in FIG. 2, the feeder insert 18 of the present invention is disposed within this central, axial chamber 16 of the tubular filtration cartridge 8. The feeder insert 18 includes an upstream containment chamber 20 and a downstream flow bypass chamber 28. The downstream flow bypass chamber 28 has a slightly larger diameter than the upstream containment chamber 20 and is integrally connected to the containment chamber 20. As illustrated in FIGS. 2–4, at either end of the upstream containment chamber 20 are located end caps 24, in which flow holes 26 allow incoming water to flow into and through the upstream containment chamber 20 and out into the downstream flow bypass chamber 28.

As shown in FIG. 3 and FIG. 4, the feeder insert 18 does not take up the entire space within the central, axial chamber 16 in the tubular filtration cartridge 8. This allows a certain amount of incoming water to flow around the upstream containment chamber 20 and avoid contact with the feed chemical 22 held within the upstream containment chamber 20. As shown in FIGS. 2 & 5–7 the downstream flow bypass chamber 28 has located on its downstream edge metering slots 30. These metering slots 30 allow incoming water which has flowed around the upstream containment chamber 20 to flow through these slots 30 and directly into the downstream flow bypass chamber 28, avoiding contact with the chemical 22 in the upstream containment chamber 20. These metering slots 30 provide a mechanism whereby the amount of chemical released into the incoming water supply stream can be regulated by allowing a certain amount of the incoming water supply to bypass the chemical 22 held within the upstream containment chamber 20.

As shown in FIGS. 2 & 5–7, the feeder insert 18 has a circumferential positioning flange 32 located on the downstream edge of the downstream flow bypass chamber 28 that holds the feeder insert 18 in position within the central, axial chamber 16 of the tubular filtration cartridge 8. FIG. 2 shows this circumferential positioning flange 32 resting on the rubber seal 14 at the downstream end of the tubular filtration cartridge 8. When the tubular filtration cartridge 8 containing the feeder insert 18 is inserted into the sump portion 4 of the water filtration system housing 2, the feeder insert 18 is held in position because a V-shaped sealing ring 33 in the inlet/outlet cap 6 engages and presses down on the rubber seal 14 when fitted against the downstream end of the tubular filtration cartridge 8 on which the circumferential positioning flange 32 is located. The pressure of the inlet/outlet cap 6 on the circumferential positioning flange 32 and the rubber seal 14 holds the circumferential positioning flange 32 and the feeder insert 18 in position within the central, axial chamber 16.

In another embodiment of the feeder insert 18, the circumferential positioning flange 32 is removed from the insert 18. The diameter of the downstream flow bypass chamber 28 is increased to create a friction fit between the exterior of the downstream flow bypass chamber 28 and the interior surface of the downstream cartridge end cap 12, to hold the insert 18 in position.

Figure 5:
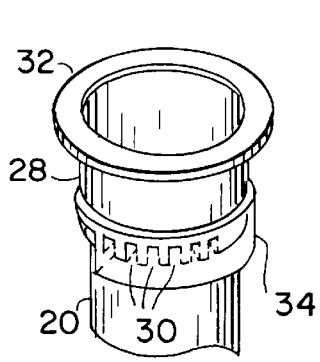
FIG. 5 is a fragmentary perspective view of a feeder insert, with an adjustable ring water flow adjustment mechanism attached, made pursuant to the present invention.
Figure 6:
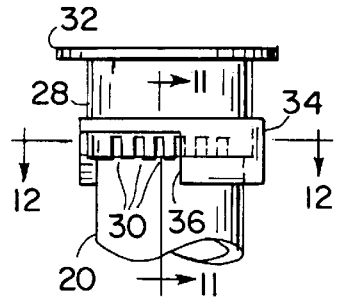
FIG. 6 is a side elevational view of a feeder insert made pursuant to the present invention with the adjustable ring water flow adjustment mechanism attached and partially engaged.
Figure 7:
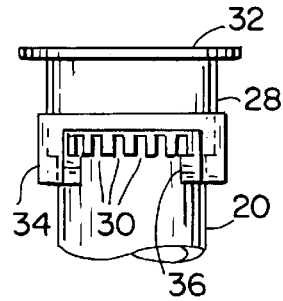
FIG. 7 is a side elevational view of a feeder insert made pursuant to the present invention with the adjustable ring water flow adjustment mechanism completely disengaged.
Figure 8:
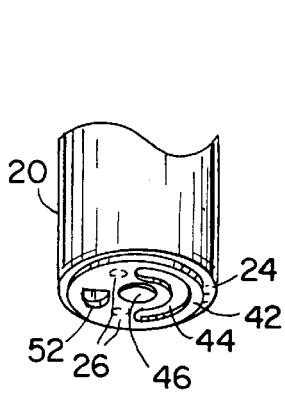
FIG. 8 is a fragmentary perspective view of a feeder insert, with a rotatable ring water flow adjustment mechanism attached, made pursuant to the present invention.
Figure 9:
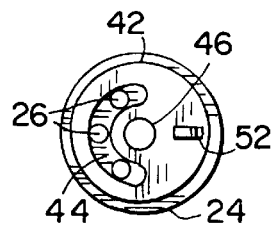
FIG. 9 is a bottom elevational view of a feeder insert made pursuant to the present invention with the rotatable ring water flow adjustment mechanism completely disengaged.
Figure 10:
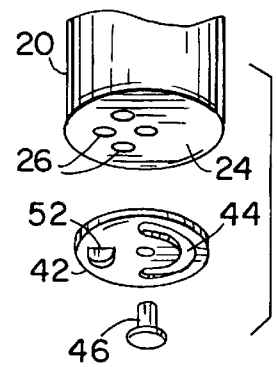
FIG. 10 is an exploded view of the rotatable ring water flow adjustment mechanism made pursuant to the present invention.
Figure 11:
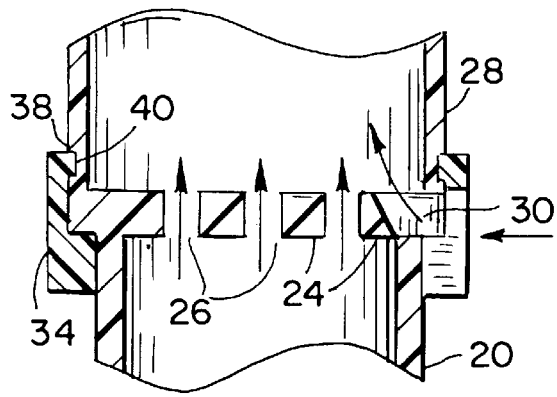
FIG. 11 is a cross-sectional view along line 11—11 of FIG. 6.
Figure 12:
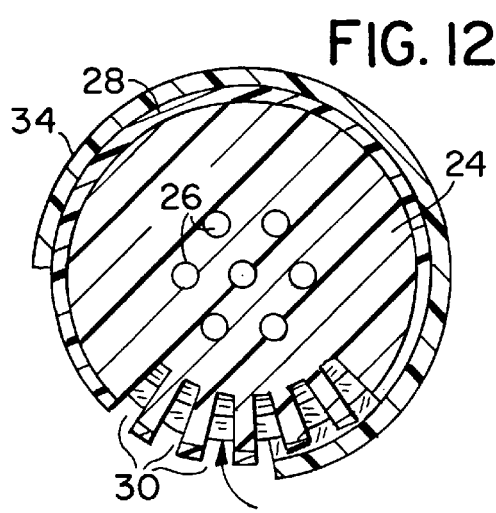
FIG. 12 is a cross-sectional view along line 12—12 of FIG. 6.
Figure 13:
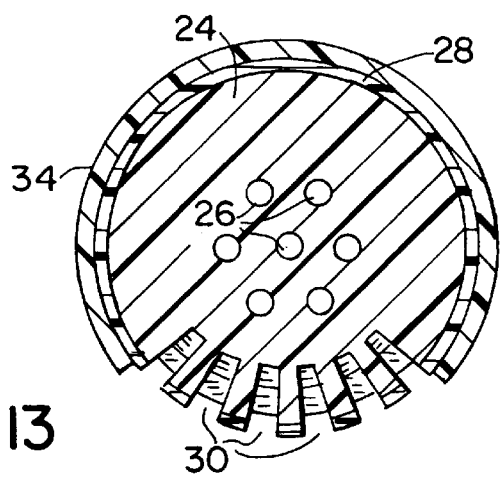
FIG. 13 is a cross-sectional view along line 12—12 of FIG. 6 showing the adjustable ring water flow adjustment mechanism completely disengaged.
Figure 14:
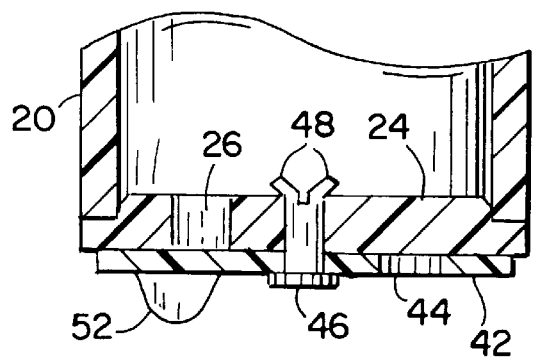
FIG. 14 is a fragmentary cross-sectional view of the rotatable ring water flow adjustment mechanism as attached to a feeder insert, as disclosed by the present invention.

FIGS. 5–7 also show the first of two additional embodiments of the present invention for adjusting the amount of incoming water to contact the chemical 22 contained within the upstream containment chamber 20. An adjustable ring 34 is positioned around the exterior of the downstream flow bypass chamber 28. This adjustable ring 34 contains a bypass notch 36 that exposes about one quarter of the circumference of the downstream flow bypass chamber 28 at a time. The adjustable ring 34 can be rotated with respect to the downstream flow bypass chamber 28 so as to position the bypass notch 36 over none, some or all of the metering slots 30 located in the downstream flow bypass chamber 28. The amount of incoming water flowing through the metering slots 30 and bypassing the chemical 22 can be controlled by rotating the adjustable ring 34 to increase or decrease the number of metering slots 30 that are open and available for incoming water to flow through. The adjustable ring 34 is attached to the downstream flow bypass chamber 28 as shown in FIG. 11. A locating flange 38 on the interior of the adjustable ring 34 is positioned within a positioning groove 40 located on the exterior of the downstream flow bypass chamber 28 above the metering slots 30. The flange 38 and groove 40 attachment mechanism allows the adjustable ring 34 to be rotated with respect to the downstream flow bypass chamber 28 while still creating a water tight seal between the interior of the adjustable ring 34 and the metering slots 30 when the ring 34 is positioned over a metering slot 30. FIG. 11 also illustrates how the original incoming water flow is recombined in the downstream flow bypass chamber 28 after being separated at the upstream containment chamber 20. The portion of the incoming water that flowed into the upstream containment chamber 20, contacting the feed chemical 22, exits the upstream containment chamber 20 through flow holes 26 in the downstream end cap 24. The remainder of the incoming water enters the downstream flow bypass chamber 28 through the metering slots 30. The two water flow portions are recombined in the downstream flow bypass chamber 28, mixing the chemical 22 contained in the first portion of the incoming water flow throughout the entire recombined incoming flow. FIG. 12 and FIG. 13 further show the adjustable ring 34 in partially engaged and completely disengaged positions with respect to the metering slots 30 located on the downstream flow bypass chamber 28, illustrating how the component flows of the recombined incoming water flow can be changed.

In the aforementioned embodiment having a downstream flow bypass chamber 28 with an increased diameter substituting for the circumferential positioning flange 32 as the mounting means for the feeder insert 18, the adjustable ring 34 is located at the upstream end of the upstream containment chamber 20. As the increased diameter of the flow bypass chamber 28 forces the exterior of bypass chamber 28 against the interior of the downstream cartridge end cap 12, forming a friction fit then between any available space for adjustable ring 34 on the flow bypass chamber 28 is removed. The ring notches 30 may still be located in the upstream end of the bypass chamber 28, but can no longer be selectively opened and closed with an adjustable ring 34. Also, the slots 30 can be removed entirely in favor of a flow bypass tube (not shown) that extends through the upstream containment chamber 20, and its upstream and downstream end caps 24, to the flow bypass chamber 28. In either embodiment the adjustable ring 34 is attached to the upstream end of the containment chamber 20 using the aforementioned flange 38 and groove 40 attachment mechanism. The ring 34 encloses half of the circumference of the downstream end cap 24 and rotates to selectively open and close any number of the flow holes located in the end cap 24 while also allowing a portion of the incoming water to flow along the flow bypass tube to the flow bypass chamber 28.

In FIGS. 8–10 and 14 the second embodiment of the water flow adjustment mechanism is shown for the feeder insert 18 of the present invention. In this mechanism a rotatable end cap 42 is attached to the upstream end of the upstream containment chamber 20. The rotatable end cap 42 contains a mounting bore at 50 and an entrance slot 44. The rotatable end cap 42 is mounted to the upstream containment chamber 20 by a mounting pin 46 inserted through the mounting bore 50 and through a flow hole 26 located in the center of upstream end cap 24 located on the upstream end of the upstream containment chamber 20. This mounting pin 46 has a pair of mounting pin securing flanges 48 that diverge upon insertion into the interior of the upstream containment chamber 20 and engage the sides of the mounting pin 46 against the interior of the flow hole 26. The rotatable end cap 42 also includes an adjustment tab 52 located on the upstream side of the end cap 42. This adjustment tab 52 allows the rotatable end cap 42 to be rotated around the mounting pin 46 with respect to the upstream containment chamber 20. By rotating the rotatable end cap 42, the entrance slot 44 may be positioned over any number of the flow holes 26 located in the upstream end cap 24 of the upstream containment chamber 20. Thus the amount of incoming water flowing into the upstream containment chamber 20 can be regulated by rotating the end cap 42 and positioning the entrance slot 44 over all, some or none of the flow holes 26 in the upstream end cap 24. Incoming water not able to flow into the upstream containment chamber 20 due to the lack of available, open flow holes 26 created by the positioning of the entrance slot 44 flows around the upstream containment chamber 20 to the metering slots 30 located on the downstream flow bypass chamber 28.

In actual operation the incoming water flows through the inlet end of the inlet/outlet cap 6 and down into the sump portion 4. The water then flows radially into the exterior of the tubular filtration cartridge 8, through the filtration substance 10, where particulate matter is removed, and is discharged into the central, axial chamber 16 of the tubular filtration cartridge 8. The incoming water flows upward along the chamber 16 and contacts the feeder insert 18 disposed within the axial chamber 16. A portion of the incoming water flows through the flow holes 26 in the upstream end cap 24 and into the upstream containment chamber 20, contacting the feed chemical 22 contained within. The remainder of the incoming water flows around the upstream containment chamber 20, to the metering slots 30 located on the upstream end of the downstream flow bypass chamber 28 and into the bypass chamber 28. The water flow entering the upstream containment chamber 20 and the water directly entering the downstream flow bypass 28 recombine in the downstream flow bypass chamber 28. The recombined water then flows outward from the downstream flow bypass chamber 28 and into the outlet end of the inlet/outlet cap 6 for discharge to the household water outlets.

The feed chemical 22 can be any slow dissolving substance that performs a secondary purification or disinfection function on the incoming water. Most typically, the chemical used is a halogenated ion exchange resin. The halogen most often used in these halogenated ion exchange resins is iodine in a tri-iodide or penta-iodide form. While the exact mechanism is not completely understood, the iodine in the resin interacts with the cell membranes of bacteria present in the incoming water supply, affecting the cell membranes of all the bacteria coming into contact with the halogenated resin in such a way as to render all of the bacteria completely and instantaneously nonviable. Also, the nonviable bacteria do not adhere to the resin, necessitating periodic cleaning or removal of the resin, but flow directly through the resin along with the incoming water supply.

Resins suitable for use in this application are found in U.S. Pat. Nos. 3,923,665, 4,190,529 and 4,420,590. These disclosed resins provide a complete and instantaneous microbial kill while being almost totally insoluble. This insolubility of these resins both negates a potential health hazard created when a large amount of iodide ions are released into a water supply and also greatly extends the useful life of these resins due to the fact that the effectiveness of the resins is not diminished by a premature loss of iodide ions. Furthermore, the few iodide ions which are periodically released into the water supply do not create a significant health risk but do provide a added microbiocidal affect downstream from the resin.

The feed chemical 22 used in the insert 18 can also be a soluble phosphate or calcium hypochlorite. Soluble phosphates are useful in these water filtration systems for household water supplies as descaling agents, reducing the amount of buildup on interiors of the pipes forming the household water supply system. Calcium hypochlorite is a slow dissolving substance that provides another water disinfection function.

Lastly, a combination of different chemicals, such as a halogenated resin and a soluble phosphate, can also be employed as the feed chemical 22 to provide multiple functions within a household water supply filtration system.

Various modes of carrying out the invention are contemplated as being within the scope of the following claims particularly pointing out and distinctly claiming the subject matter which is regarded as the invention.

I claim:

1. In a point of use water purification system including a filter housing comprised of a sump, an inlet/outlet cap detachably mounted to the sump and thereby holding a tubular filtration cartridge within the filter housing, the tubular filtration cartridge defining a central, axial chamber, and end seals attached to the upper and lower ends of the filtration cartridge in engagement with the sump and the cap at each end to form a seal therebetween, a feeder insert for use within the central chamber of the cartridge comprised of:

a lower upstream containment chamber, having an outside dimension less than that of the central chamber, for containing chemicals for release into the water supply, the lower upstream containment chamber having a pair of end caps, each cap having a number of flow passages therein for directing a flow of water through the upstream containment chamber;

a downstream flow bypass chamber mounted to the downstream end of the containment chamber having metering slots therein that allow an amount of unpurified water to flow to the outlet without entering the lower containment chamber; and a mounting means secured to the insert and having a diameter slightly greater than the internal diameter of the central chamber to support the insert and maintain its position in the central chamber relative to the filtration cartridge.

2. The feeder insert as in claim 1 wherein the downstream flow bypass chamber has an interior diameter slightly greater than the exterior diameter at the upper edge of the upstream containment chamber.

3. The feeder insert as in claim 2 wherein the metering slots are located on the upstream end of the downstream flow bypass chamber.

4. The feeder insert as in claim 2 including a rotatable end cap having a water entrance slot and a means for manually positioning the entrance slot relative to the flow passages in said cap to variably adjust the flow through the lower upstream containment chamber, said end cap mounted to the exterior surface of one of the end caps of the lower containment chamber.

5. The feeder insert as claim 4 wherein the mounting means for the rotatable end cap is comprised of:

a pin extending from the rotatable end cap opposite a manual adjustment knob through the center of the end cap, and a securing flange fixed to the end of the pin opposite the rotatable end cap that engages the interior surface of the end cap so as to allow the rotatable cap to be attached to the end cap and rotatable with respect thereto.

6. The feeder insert as in claim 2 including an adjustable ring having a water bypass slot and a means for manually positioning the bypass slot relative to the metering slots in the flow bypass chamber to variably adjust the flow through the bypass chamber, said ring mounted to the outside lower edge portion of the flow bypass chamber.

7. The feeder insert as in claims 6 wherein the manual adjustment means for the adjustable ring is comprised of:

a groove located in the exterior surface of the flow bypass chamber adjacent the metering slots in the flow bypass chamber, and a locating flange extending outward from the interior surface of the adjustable ring, the flange fitting within the groove to hold the ring in position over the metering notches while allowing for rotation of the ring with respect to the flow bypass chamber.

8. The feeder insert as in claim 1 wherein the mounting means is a circumfrential positioning flange mounted to the downstream end of the flow bypass chamber and having a diameter slightly greater than the internal diameter of the central chamber, allowing the flange to rest on the end seal at one end of the tubular filtration cartridge.

9. The feeder insert as in claim 1 wherein the length of the containment chamber and flow bypass chamber combined is approximately one half the length of the central, axial chamber defined by the tubular filtration cartridge.

10. The feeder insert as in claim 1 wherein the chemical held in the containment chamber is halogenated resin.

11. The feeder insert as in claim 1 wherein the chemical held in the containment chamber is a soluble phosphate.

12. The feeder insert as in claim 1 wherein the chemical held in the containment chamber is a combination of a halogenated resin and a soluble phosphate.

* * * * *